3,170,188
RETRACTABLE SIDEWALL-VALVE CURING PIN
Archie H. Gollings, Akron, Ohio, assignor to The Firestone Tire & Rubber Company, Akron, Ohio, a corporation of Ohio
Continuation of application Ser. No. 774,941, Nov. 19, 1958. This application Oct. 25, 1962, Ser. No. 234,005
1 Claim. (Cl. 18—2)

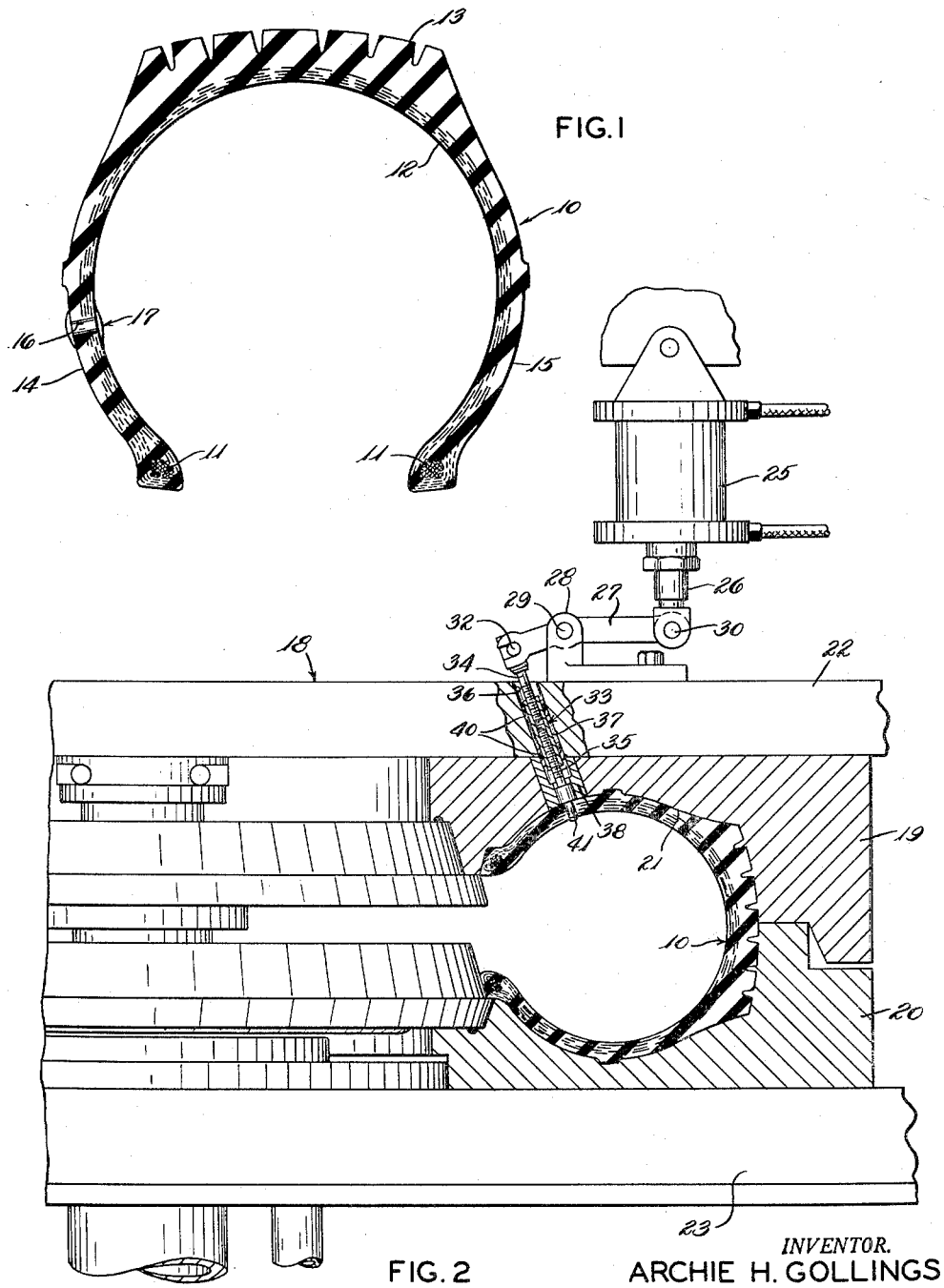

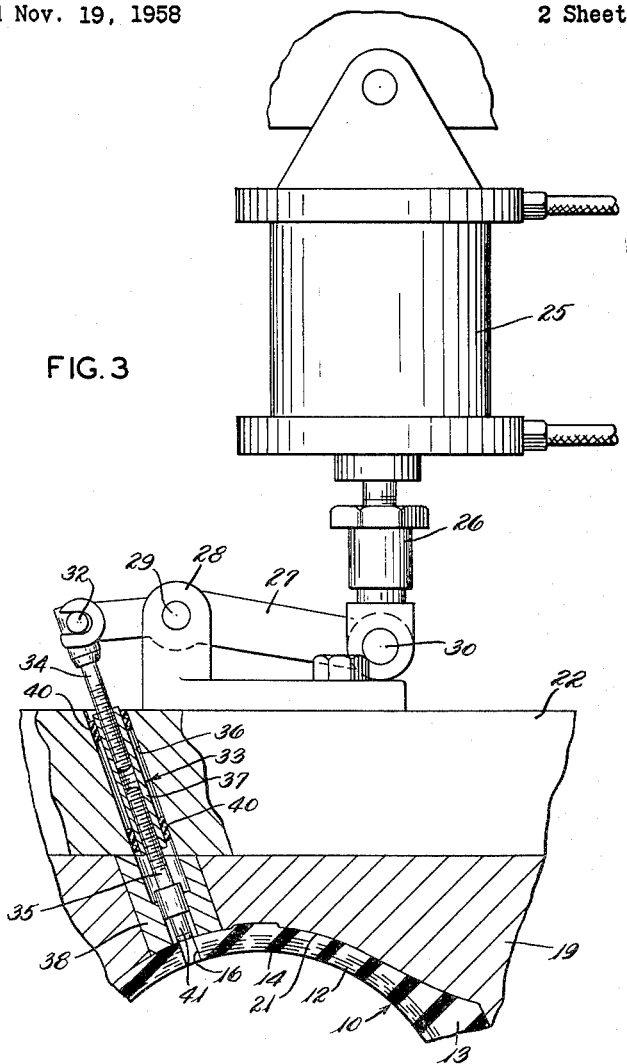

This invention relates to the vulcanization of pneumatic tires and more specifically to the forming of openings in the side walls of tires such as for tire sidewall inflation valves.

The present application is a continuation of my prior application Serial Number 774,941, filed November 19, 1958, which is now abandoned.

Heretofore, in forming openings in tire walls it was common practice to provide the inside of a tire mold cavity with a stationary curing pin against which the tire was expanded to form a hole in the sidewall of a tire. Difficulty was encountered with this method due to the fact that the pin was forced through the tire sidewall as the tire was being expanded in the tire mold, to cause, in many cases, tearing of the cold tire sidewall and tire cords which weakened the tire and ultimately caused tire failure. Another objection was that a larger than desired opening was frequently formed. Another objection to this method was that while the tire was being removed from the mold, the tire sidewall was frequently raked and damaged by the protruding curing pin, and this also resulted in premature tire failure.

This invention overcomes the aforementioned difficulties by providing a retractable curing pin to form an opening in the tire sidewall. The curing pin is retained in withdrawn position until the unvulcanized tire is fully expanded by vulcanizing fluid under pressure against the walls of the mold. The pin is then introduced into and through the sidewall of the tire after the tire has been heated from the curing heat and pressure. Prior to the release of curing pressure, the pin is retracted to permit removal of the tire from the mold, without damage to the tire, when the mold is opened.

It is therefore an object of this invention to provide improved means for forming a hole in the sidewall of a tire.

Another object is to provide hole forming means which will not injure the tire carcass during operation.

Another object is to provide a hole forming means which will evenly displace tire cords of the ply fabric around the hole being formed.

Another object is to provide a hole forming means which will provide an accurate opening.

These and other objects will become more apparent upon reference to the following specification and drawings in which:

FIGURE 1 is a sectional view of an automobile tire incorporating a sidewall inflation valve.

FIGURE 2 is a fragmentary sectional view of a vulcanizing mold showing a sidewall valve hole being formed in a tire.

FIGURE 3 is an enlarged fragmentary view of the hole forming mechanism of the invention after the hole has been formed.

Referring to FIGURE 1, a tubeless tire 10 is shown comprised of a pair of inextensible bead wire bundles 11, 11 suitably anchored and adhered to a fabric body portion 12. The tire 10 has a tread portion 13 merging into sidewalls 14 and 15. The inner periphery of tire 10 is provided with an air impervious innerliner. Sidewall 14 is provided with a hole or seat 16 in which is mounted a sidewall inflation valve 17.

Referring now to FIGURE 2, a tire vulcanizing mold assembly 18 is shown as comprising an upper mold shell 19 and a lower mold shell 20 defining a tire molding cavity 21 which confines the tire 10 during vulcanization. Upper mold shell 19 is secured to a steam platen 22, and lower mold shell 20 is secured to a steam platen 23.

Mounted on the upper portion of the mold 18 is an air cylinder 25, having a piston rod 26, pivotally mounted to one end of an actuating lever 27 by pin 30. The lever 27 is pivotally mounted in a bracket 28 by pin 29. The opposite end of arm 27 is provided with slot which receives pin 32 for pivotal motion of a curing pin plunger assembly 33.

Plunger assembly 33 is confined within passage 36 passing through the upper platen 22 and relief plug 38 in upper mold shell 19. The plunger 33 is provided with suitable suitable packing or seals 40 to provide a fluid-tight fit between the passage 36 and the plunger 33.

Plunger assembly 33 comprises a pair of oppositely threaded rods 34 and 35 threaded into a complementarily threaded sleeve 37 to facilitate adjustment of the length of the plunger assembly. When sleeve 37 is turned in one direction, it will extend the threaded rods 34 and 35; when turned in the opposite direction, the sleeve will retract the threaded rods 34 and 35. At the outermost end and integral with rod 35 is a curing pin 41 reciprocated through plunger 33 by arm 27 and air cylinder 25.

In operation of the invention the unvulcanized tire carcass is placed in the mold 18, the mold is closed, and vulcanizing fluid under pressure is introduced into the tire forcing the tire outwardly against the walls of the mold shells 19, 20. Cylinder 25 is then actuated through suitable control means, not shown, to slide the end of pin 41 out of passage 36 and into and through the sidewall 14 of the tire.

Pin 41 remains in this position throughout the cure and is retracted just prior to the release of the internal curing pressure. With the pin 41 in the retracted position, the mold is opened and the tire 10 is removed therefrom with ease and without damage to the side wall 14 of the tire 10. Sidewall valve 17 is then inserted in hole 16 completing the operation.

While one modification of the invention has been shown and described, it will be apparent that other modifications may occur to those skilled in the art without departing from the scope of the invention, the essential features of which are summarized in the appended claim.

What I claim is:

Apparatus for forming a valve opening in the sidewall of a tire while said tire is undergoing the process of vulcanization in a mold, comprising a single passage in the mold radially inwardly of the tread area of the tire and substantially normal to the tire sidewall, a sleeve slidable in said passage, a plunger assembly adapted for reciprocal motion axially of said single passage comprising first and second rods oppositely threaded into said sleeve, the first of said rods terminating in a curing pin having a closed end, and articulating means to selectively confine the length of said curing pin completely to said passage and to move said pin through the tire sidewall in a direction substantially normal thereto.

References Cited by the Examiner
UNITED STATES PATENTS
3,096,541  7/63  Sindelar _____ 18—2

MICHAEL V. BRINDISI, *Primary Examiner.*